United States Patent [19]

Hack et al.

[11] Patent Number: 4,766,448

[45] Date of Patent: Aug. 23, 1988

[54] ELECTROSTATIC PRINTHEAD METHOD AND APPARATUS

[75] Inventors: James R. Hack, Villa Park; Bernard V. Masson, Yorba Linda; David T. Beegan, Newport Beach, all of Calif.

[73] Assignee: Sanders Associates, Inc., Nashua, N.H.

[21] Appl. No.: 86,919

[22] Filed: Aug. 19, 1987

[51] Int. Cl.[4] .......... G01D 15/00

[52] U.S. Cl. .......... 346/150; 346/155

[58] Field of Search .......... 346/150, 153.1, 155, 346/165, 1.1, 138 C; 24/854, 855, 856, 874, 882, 884; 156/901, 902, 629; 400/114; 101/DIG. 13; 358/300

[56] References Cited

U.S. PATENT DOCUMENTS 4,415,403 11/1983 Bakewell .......... 346/155

FOREIGN PATENT DOCUMENTS 0047653 4/1979 Japan .......... 346/155

*Primary Examiner*—Arthur G. Evans

*Attorney, Agent, or Firm*—Donald A. Streck; Wm. F. Porter, Jr.

[57] ABSTRACT

Methods and apparatus for forming an electrostatic printhead. The basic printhead member if formed by casting an insulating material around a plurality of side-by-side spaced wires. One side of the insulating material and the wires are cut off to form a printhead face. The other side of the insulating material and the wires are cut off to form an attachment face with the wire ends exposed. A printed circuit board having electrical contacts along the edge is positioned adjacent the exposed wire ends of the attachment face and the wire ends are wire bonded to the contacts. In one embodiment, there are two printed circuit boards positioned on either side of the attachment face and then folded together following the wire bonding. In another embodiment, the attachment face is formed as ledges having the exposed ends of the wires cut as rectangular pads for more area of attachment and the insulating material is attached to the edge of a single printed circuit board. The preferred automated apparatus for doing the wire bonding includes testing apparatus for testing each wire bond and for re-bonding bad joints before moving on to the next wire end/contact pair to be bonded.

26 Claims, 4 Drawing Sheets

ELECTROSTATIC PRINTHEAD METHOD AND APPARATUS

BACKGROUND OF THE INVENTION

The present invention relates to printheads for electrostatic printers, and the like, and, more particularly, to apparatus for forming and attaching an electrostatic printhead to a printed circuit board to make an electrostatic printhead assembly comprising, means for disposing a plurality of wires within an insulating material in a common plane in parallel, spaced relationship; means for cutting the wires and the insulating material adjacent one end of the wires in a plane perpendicular to the wires to form a print head face; means for cutting the wires and the insulating material adjacent the other end of the wires to form an attachment face having the ends of the wires exposed at the surface thereof; means for disposing a plurality of spaced, metal, electrical contacts along the edge of the printed circuit board; means for positioning the printed circuit board with the electrical contacts in adjacent, parallel, spaced relationship with the ends of the wires of the attachment face; and, means for wire bonding connecting wires between the electrical contacts and the exposed ends of the wires of the attachment face.

At present, the manufacturing of the printhead employed in an electrostatic printer is a highly labor-intensive undertaking. As shown in FIG. 1, fine wire 10 having a diameter of about 2 mils, more or less, is evenly wound about the surface of a lathe mandrel 12 rotating as indicated by the arrow 14. Depending on the resolution to be produced by the printer, the wires 10 are arranged in precise straight rows of 100 to 500 per inch across a head-molding cavity 16 longitudinally disposed in the surface of the mandrel 12. Following the wrapping procedure, a mold (not shown) is disposed about the cavity 16 and the mold and cavity 16 are filled with a plastic molding material which, when cured, forms a printhead body 18 having the wires 10 passing therethrough as shown in FIG. 2. The wires 10 are cut flush with the face 20 of the printhead body 18 and the printhead body 18 and wires 10 are separated from the mandrel 12 as shown in FIG. 3. The face 20 typically appears as shown in FIG. 4, comprising two adjacent staggered rows 22 of wires 10. In a typical printhead as employed by the assignee of the present application, there are 14,080 wires 10 emerging from the back 22 of the printhead body 18, which body is approximately three feet in length. As depicted in FIG. 5, the labor-intensive portion of the manufacturing process according to the prior art comprises all 14,080 wires 10 being hand-attached to individual terminals 26 of a printed circuit board 28 by means of which the resultant printhead 30 is connected into the printer. As can be appreciated, handwiring 14,080 wires is a time-consuming process.

Wherefore, it is the object of the present invention to provide a method and apparatus for automatically assembling the wires of a printhead body as described above to the terminals of a printhead circuit board.

Other objects and benefits of the present invention will become apparent from the description that follows hereinafter taken in conjunction with the drawing figures with accompany it.

SUMMARY

The foregoing object has been achieved by apparatus and methods for, in the broadest terms, wire bonding the wires of a printhead member to the contacts of one or more printed circuit boards. One method of forming and attaching an electrostatic printhead to a printed circuit board to make an electrostatic printhead assembly comprises the steps of, disposing a plurality of wires within an insulating material in a common plane in parallel, spaced relationship; cutting the wires and the insulating material adjacent one end of the wires in a plane perpendicular to the wires to form a print head face; cutting the wires and the insulating material adjacent the other end of the wires to form an attachment face having the ends of the wires exposed at the surface thereof; disposing a plurality of spaced, metal, electrical contacts along the edge of the printed circuit board; positioning the printed circuit board with the electrical contacts in adjacent, parallel, spaced relationship with the ends of the wires of the attachment face; and, wire bonding connecting wires between the electrical contacts and the exposed ends of the wires of the attachment face. In one variation of this method, the step of cutting the wires and the insulating material to form an attachment face comprises the steps, of, cutting the wires and the insulating material adjacent the other end of the wires in a plane perpendicular to the wires; and, removing a portion of the wires and the insulating material from one side of the wires to a point in a plane passing midway through the wires to form a ledge in the insulating material having the exposed ends of the wires to which the wire bonding is made in the form of elongated rectangular pads. In another variation, the same step comprises the step of cutting the wires and the insulating material adjacent the other end of the wires in a plane forming an acute angle with the wires whereby the exposed ends of the wires to which the wire bonding is made are in the form of elongated elliptical pads. In this method the preferred method of positioning the printed circuit board comprises the steps of, cutting a notch in the insulating material of the attachment face adjacent and parallel to the exposed wire ends; and, attaching the insulating material to the edge of the printed circuit board with the printed circuit board in the notch.

Another method of assembling an electrostatic printhead assembly according to the present invention comprising the steps of, disposing a plurality of first wires within an insulating material in a first common plane in parallel, spaced relationship; disposing a plurality of second wires within the insulating material in parallel, spaced relationship in a second common plane parallel to the first common plane; cutting the wires and the insulating material adjacent one end of the wires in a plane perpendicular to the wires to form a print head face; cutting the wires and the insulating material adjacent the other end of the wires to form an attachment face having the ends of the wires exposed at the surface thereof; disposing a plurality of spaced, metal, electrical contacts along the edge of a first printed circuit board; disposing a plurality of spaced, metal, electrical contacts along the edge of a second printed circuit board; positioning the printed circuit boards and the attachment face in a common plane with respective ones of the board on each side of the insulating material with the electrical contacts in adjacent, parallel, spaced relationship with the ends of the wires of the attachment face; wire bonding connecting wires between the electrical contacts and the exposed ends of the wires of the attachment face; bending the connecting wires 90° to fold the printed circuit boards towards one another to a position of parallel, spaced relationship with one another; and, disposing insulation between the printed circuit boards.

As a preferred addition to both methods, the wire bonding procedure is tested for electrical continuity at each connection between the printhead member and the printed circuit board to assure proper bonding before the automated apparatus which is preferred for implementation moves to the next connection.

DESCRIPTION OF THE PREFERRED EMBODIMENT

While the description contained hereinafter is specific to an improvement in the manufacture of electrostatic printheads according to a particular construction, those skilled in the art will recognize that the methods and apparatus disclosed herein can be employed with equal benefit to electrostatic printheads of alternate construction and devices other than electrostatic printheads presenting the same sort of assembly problems.

Figure 4:
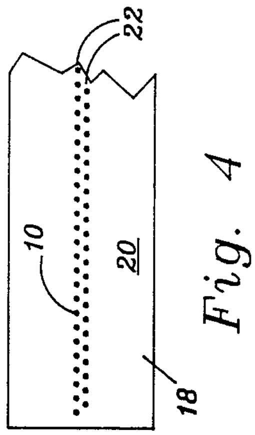
FIG. 4 is a view of a portion of the face of the printhead body of FIG. 3 showing the arrangement of the printhead wires therein.
Figure 3:
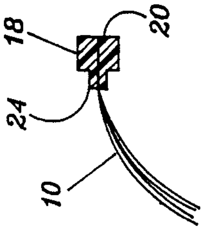
FIG. 3 shows a printhead body 18 following molding with the electrostatic print wires extending from the back surface thereof.
Figure 2:
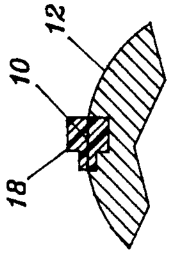
FIG. 2 is a cutaway view through a portion of the mandrel of FIG. 1 showing the manner in which the printhead body 18 molded and placed therein.
Figure 5:
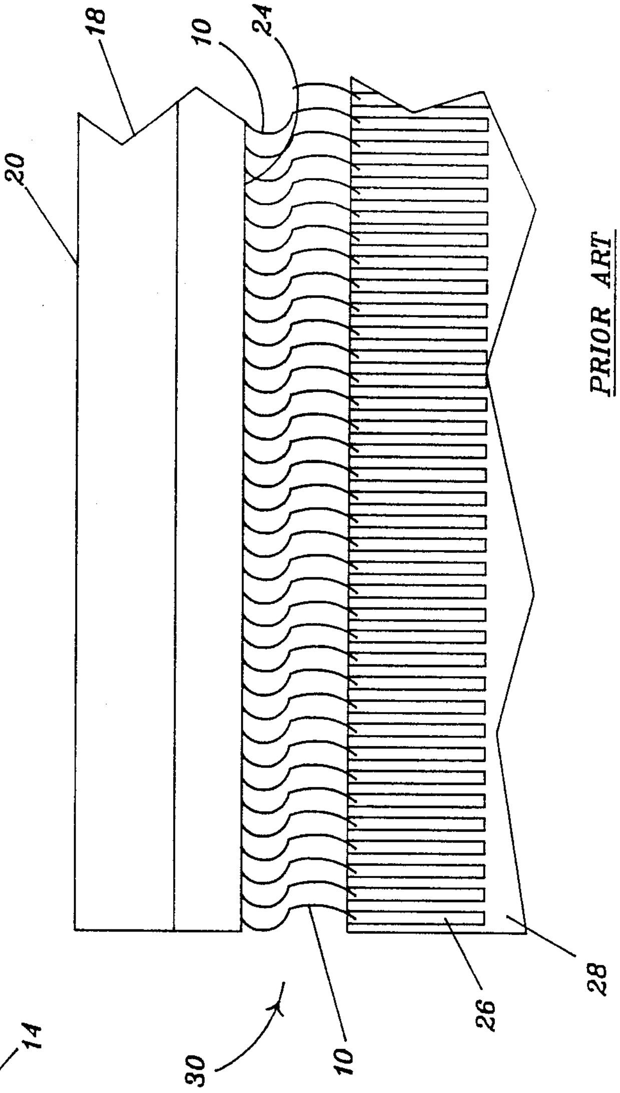
PRIOR ART Fig. 5
FIG. 5 is a plan view of a portion of a printhead body and a printed circuit board showing the prior art method of hand wiring the wires from the printhead body to the printed circuit board.
Figure 1:
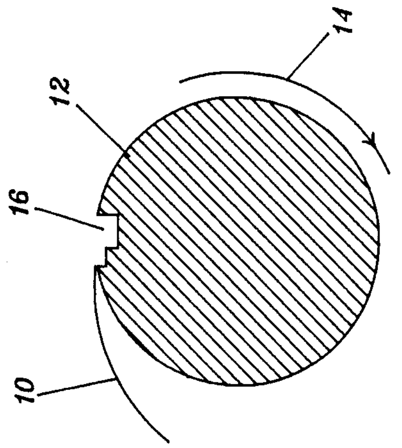
FIG. 1 is a cutaway end view through a mandrel winding the wires to be employed within an electrostatic printhead.
Figure 9:
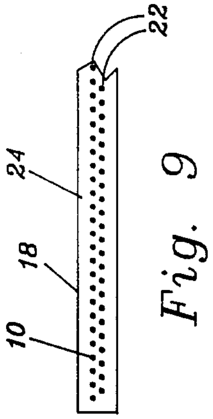
FIG. 9 is a drawing of the back surface of the printhead body of FIG. 8.
Figure 8:
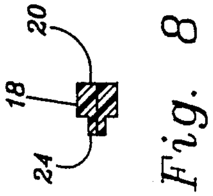
FIG. 8 shows the printhead body of FIG. 7 with the wires trimmed to the back surface according to one embodiment of the present invention.
Figure 7:
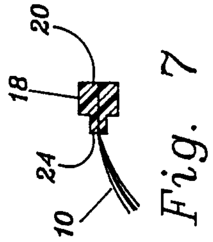
FIG. 7 is a cutaway view through a printhead body as produced by the mandrel of FIG. 6.
Figure 10:
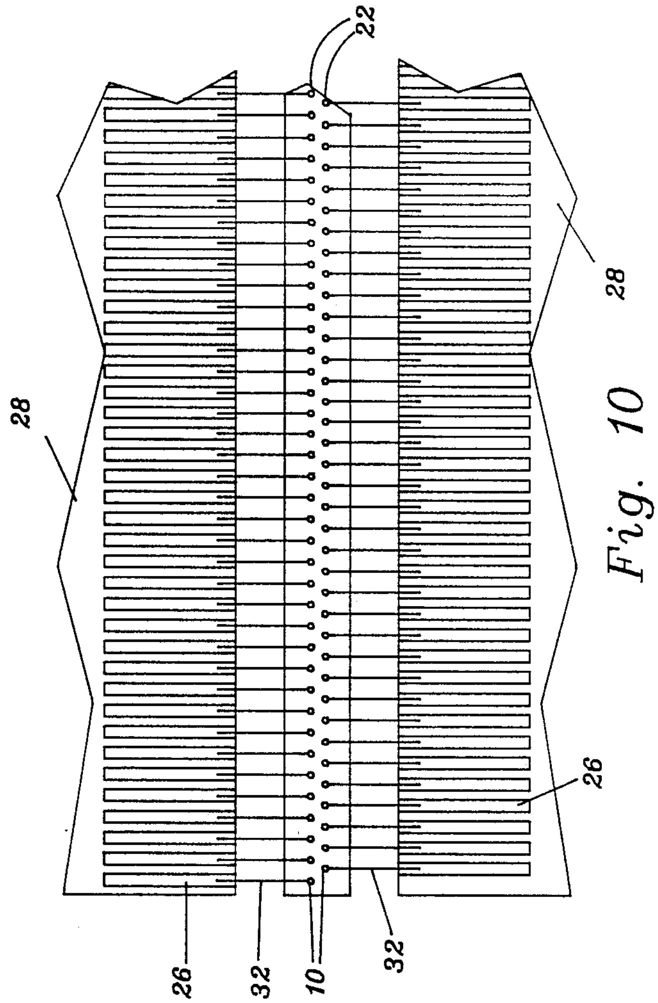
FIG. 10 shows one embodiment of the present invention wherein the wires within the two rows of the back surface of the printhead body are wire-bonded to respective ones of a pair of opposed printed circuit boards.
Figure 11:
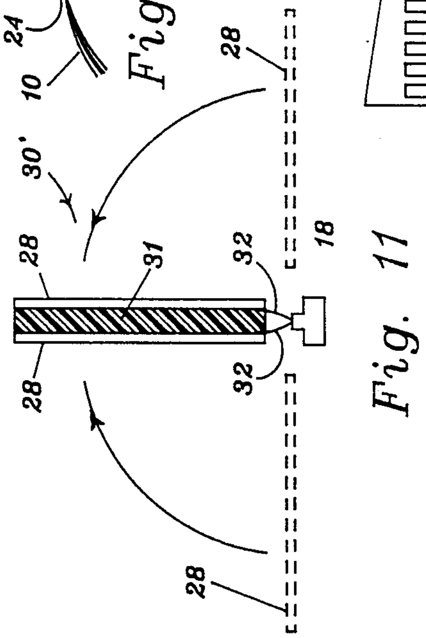
FIG. 11 shows the manner in which the two printed circuit boards of FIG. 10 are folded towards each others at 90° to form a planar printhead assembly.
Figure 6:
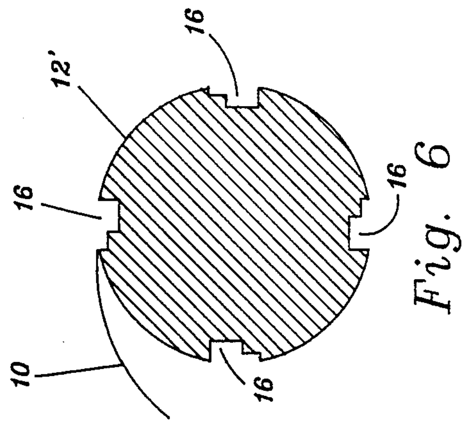
FIG. 6 shows a cutaway end view through a winding mandrel according to the present invention wherein four printhead bodies are produced at one time.

As a first benefit of the present invention, the wires 10 following the molding process are removed and are waste. Therefore, a first benefit as shown in FIG. 6 is the use of a mandrel 12' having a plurality of head-molding cavities 16 disposed about the circumference. As a result, a plurality of printhead bodies 18 as shown in FIG. 7 with short wires 10 emerging from the back surface 24 can be produced in a single winding and molding operation. Following the removal of the printhead body 18 from the molding cavity 16, the wires 10 are cut off flush with the back surface 24 as shown in FIG. 8. The back surface 24, therefore, appears as shown in FIG. 9. According to this embodiment, a pair of printed circuit boards 28 are positioned adjacent respective ones of the rows 22 of wire 10 as depicted in FIG. 10. The terminals 26 are spaced evenly from the adjacent wires 10 and in substantially the same plane as the back surface 24. Employing wire-bonding techniques known in the art as employed in the connecting of integrated circuit chips, and the like, to their carrier apparatus, the exposed ends of the wires 10 are wire-bonded to respective ones of the terminals 26 on the adjacent printed circuit boards 28. Following the wire-bonding process, the printed circuit boards 28 are folded towards each other 90° as depicted in FIG. 11 to form a generally planar electrostatic printhead assembly 30' which can then be potted together for strength and breakage resistance. Insulating material 31 is disposed between the boards 28 to form a unitary assembly, prevent electrical contact between the boards 28, and prevent relative movement between the boards 28. As is well known to those skilled in the art, the wire bonding procedure comprises attaching wire bonding wires 32 of gold to the terminals 26 and exposed ends of the wires 10 by the use of ultrasonics, electron beam welding, or the like.

Figures 12, 13, 14, 15, 16, 17, 18, 19, 20:
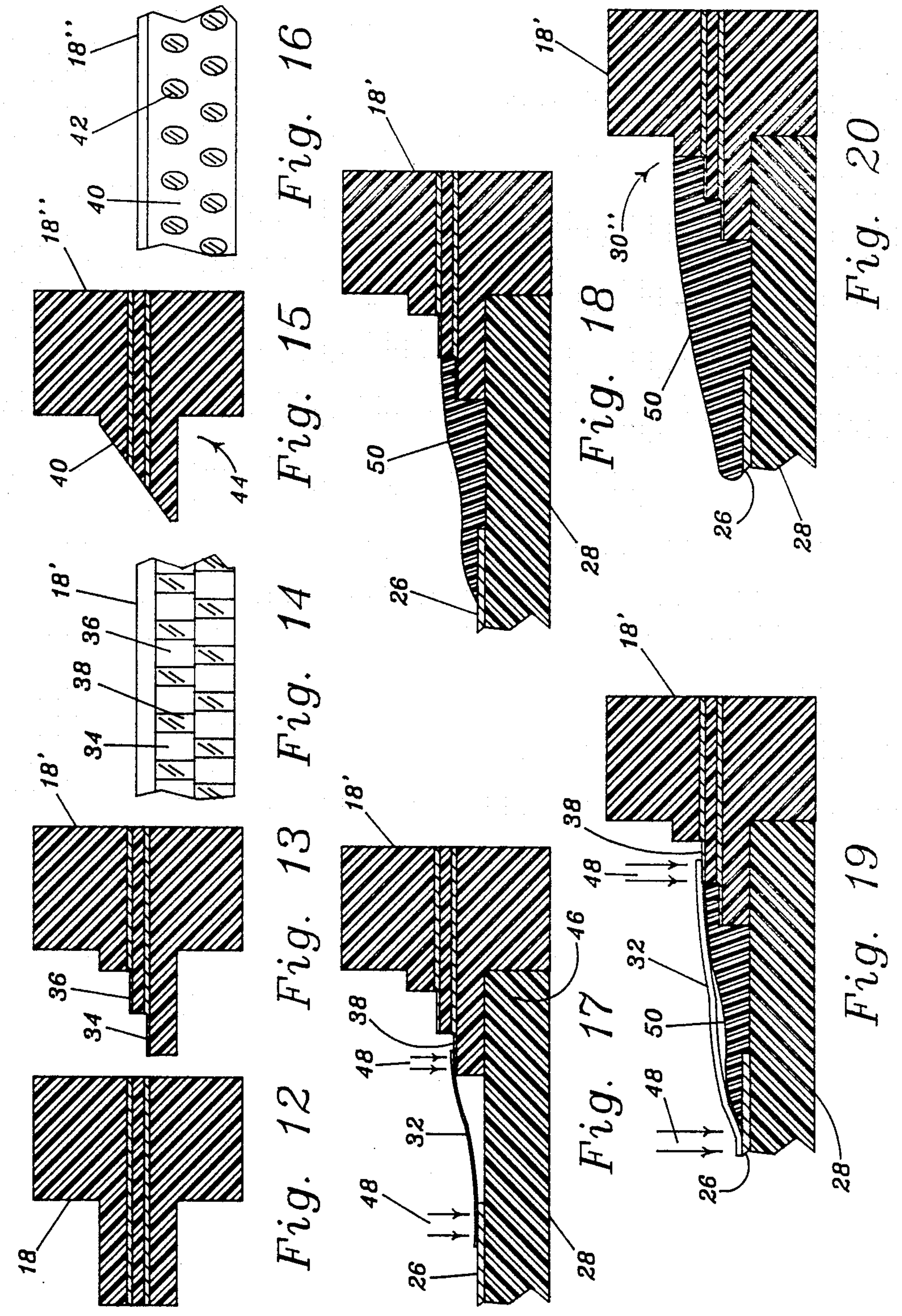
FIG. 12 is an enlarged cutaway view through the printhead body of FIG. 8.
FIG. 13 is a cutaway view through the printhead body of FIG. 12 following machining according to one embodiment of the present invention to expose more useful surface of the wires contained therein for bonding purposes.
FIG. 14 is a plan view of a portion of the machined surface of FIG. 13 showing how two rows of rectangular pads are formed thereby.
FIG. 15 is a cutaway end view through the printhead body of FIG. 12 following the cutting of the back surface at an angle.
FIG. 16 is a plan view of a portion of the angled rear surface of FIG. 15 showing how elliptical pads are formed at the exposed ends of the wires by the angled cutting thereof.
FIGS. 17–20 are cutaway views through the printhead body as modified in FIG. 13 as attached to the edge of a printed circuit board and showing the preferred steps for wire bonding between the wires in the printhead body and the terminals on the printed circuit board.

While the above-described embodiment of the present invention could be accomplished to provide a vast improvement over the hand-wiring techniques of the prior art, further refinements to the above-described technique as envisioned by the applicant could produce a superior product as well as simplify the wire bonding procedure. To this end, attention is directed to FIGS. 12–20. As shown in the enlarged cutaway view of FIG. 12. The wires 10 within the printhead body 18 lie along two planes corresponding to the rows 22 previously mentioned. If the wires 10 are cut off flush with the back surface 24 as previously described and as shown in FIG. 12, the exposed ends present a target for wire bonding of approximately 2 mils in diameter. While the gold wire bonding wires 32 are typically 1 mil in diameter, there is still not a lot of area for affecting a substantial bond between the wires 10, 32. Moreover, where the wires 32 are subsequently bent at 90° as depicted in FIG. 11, the strains imposed could disconnect one or more of the wires 32. According to best estimates from those skilled in the art, modern wire-bonding techniques can produce a bad bond from 0.5% to 1% of the time. With integrated circuits which are produced for pennies and contain few leads, relatively speaking, high defect rates are acceptable as the profit margins are high and defective parts can simply be scrapped upon testing. With electrostatic printheads where in one non-functioning wire renders the entire printhead unusable and there are, for example, 14,080 wires, even at a 0.5% bad bonding rate, that means that 70 wires in each printhead are bad and, therefore, there is a 100% rejection rate. That, of course, is completely intolerable. Wherefore, to affect the basic teaching of the present invention in a manner which is commercially useful, additional provisions have to be made.

One technique employed in the art is so-called "double bonding" wherein each wire is subjected to a bonding force at two close adjacent locations. This, of course, requires more exposed areas for joining at spaced locations. One technique as tested by the applicant herein to provide that additional space is the machining of the rear surface 24 at right angles thereto at points passing through the midpoint of the wires 10 as shown in FIG. 13. This produces two stair steps 34 and 36 with exposed rectangular pads 38 at the ends of the wires 10 as shown in FIG. 14. An alternate approach is shown in FIGS. 15 and 16 wherein the back surface 24 is cut at an angle to form a single angled rear surface 40 with elliptical pads 42 formed by the ends of the wires 10. The modification to the printhead body 18 as indicated as 18' in FIG. 13 is preferred for its suitability in a mode of construction as depicted in FIGS. 17–20.

As shown in FIG. 15, the printhead body 18' has a rectangular notch 44 longitudinally formed therein opposite the stair steps 34, 36. The printhead body 18' is first attached to the edge 46 of the printed circuit board 28 adjacent the terminals 26 by fitting the notch 44 thereto with an appropriate adhesive, rivets, or the like. As thus configured, the lower and upper stair steps 34, 36 are in planes parallel to and close adjacent to the terminals 26. As shown in FIG. 17, the wire-bonding wires 32 are first double bonded, as indicated by the arrows 48, between the rectangular pads 38 on the lower stair step 34 and their respective terminals 26 on the printed circuit board 28. As shown in FIG. 18, plastic insulation material 50 is then disposed over the non-insulated wire-bonding wires 32 as just placed leaving the terminals 26 to be connected to the rectangular pads 38 on the upper stair steps 36 and those rectangular pads 38 exposed. As shown in FIG. 19, the wire bonding wires 32 are next double bonded between the rectangular pads 38 on the upper stair step 36 and their respective terminals 26. The entire bonded area is then covered with the plastic insulation material 50 as shown in FIG. 20. This results in a very strong and stable printhead 30''. Note also that the wire bonding wires 32 are not subjected to any undue bending or strain and are bonded into place to aid in preventing subsequent detachment during assembly, shipment, and use.

Figure 21:
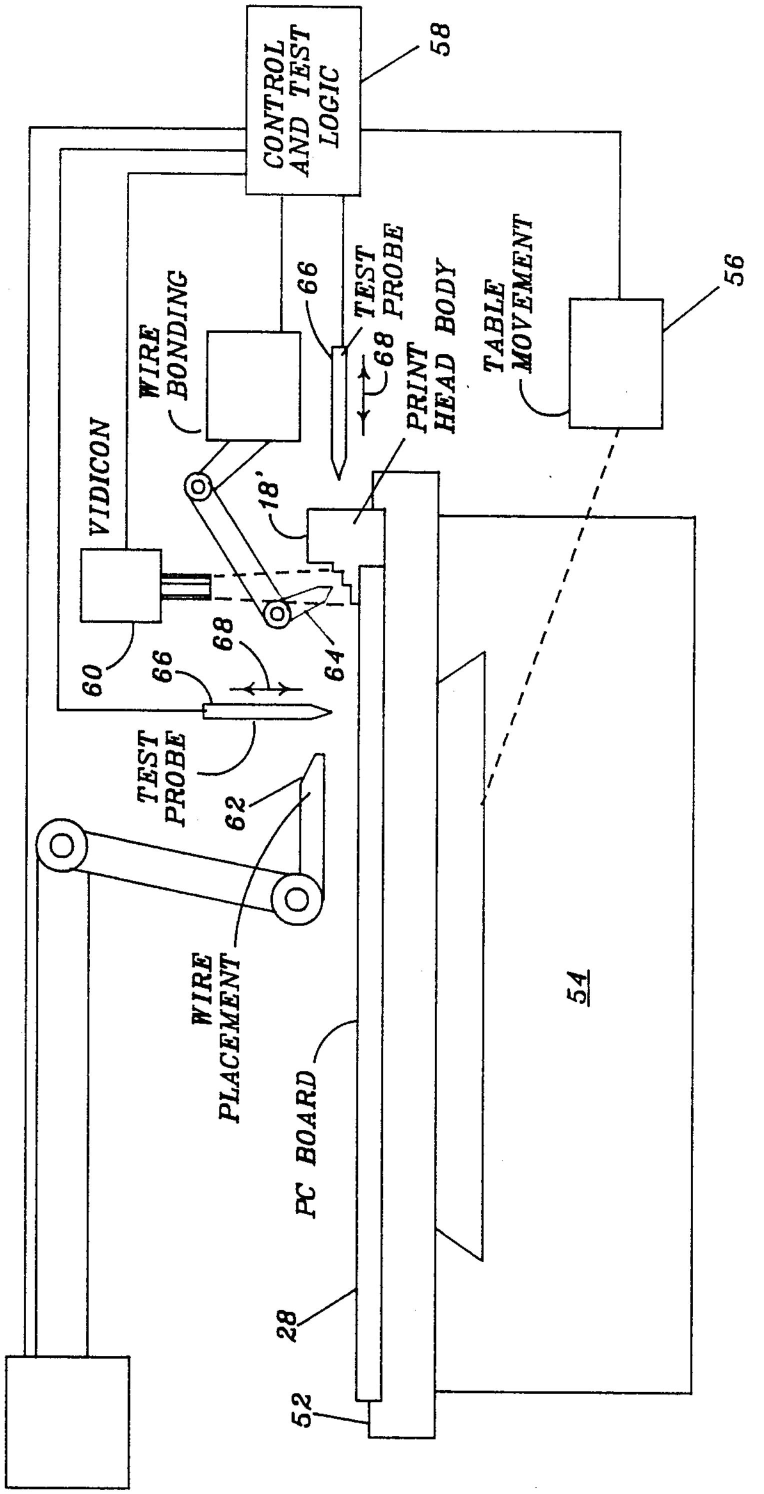
FIG. 21 shows in simplified form apparatus for constructing and simultaneously testing electrostatic printheads according to the present invention.

While the above-described modification to the method and apparatus of the present invention greatly improves the resultant printhead and minimizes bonding errors and/or separation, in and of itself, it is not sufficient to reduce the failure rate to an acceptable level with conventional wire-bonding techniques. A failure rate of 0.007% is equivalent to one broken or non-bonded wire in each printhead. That still amounts to a 100% rejection rate for the printheads. To eliminate this problem, the apparatus and manufacturing technique depicted by FIG. 21 should be employed within the scope and spirit of the present invention. According to the present invention as depicted in FIG. 21, the wire bonding and testing thereof takes place simultaneously. The printed circuit board 28 and printhead body 18 as bonded thereto in the manner of FIG. 17 are gripped by a jig 52 positioned on a numerical control type table 54 which can be moved, preferably bidirectionally, by movement apparatus 56 under the control of control and test logic 58. It should be noted at this point that the individual components of the assembly system of the present invention are known in the art and, per se, form no point of novelty of the present invention. The combination, however, and its manner of use is believed to be novel to the present invention. A video camera or videcon 60 is positioned to view the work area thereunder at which point the wire bonding takes place. Through the use of videcon viewing the area and employing techniques known in the art of microelectronic robotics, very accurate placement of the components for wire-bonding can be affected. Wire placement robotic apparatus 62 is disposed adjacent the work area under the videcon 60 as is wire-bonding apparatus 64. Employing the apparatus as thus described, the printhead body 18 and printed circuit board 28 can be moved accurately under the videcon and the wire placement apparatus 62 and wire-bonding apparatus 64 employed under the control of control and test logic 58 to place and bond the wire-bonding wires 32 in the manner described above with respect to FIGS. 17–20. Additionally, however, a pair of test probes 66 are positioned to be moved into and out of contact with the terminals 26 and wires 10, respectively, for example, as indicated by the arrows 68 under the control of the control and test logic 58. Employing the above-described apparatus, the control and test logic 58 of the present invention accomplishes simultaneous assembly and testing of a printhead according to the present invention in the following manner. An initial starting pad 38 is positioned at a (0,0) starting point under the videcon 60 through the use of the table movement apparatus 56. The initial wire-bonding wire 32 from the first pad 38 on the lower stair step 34 to its appropriate terminal 26 is affected. The test probes 66 are then moved into contact across the wire-bonding joint just made and the continuity through the joint is tested by the control and test logic 58. If desired, other types of testing of the joint known in the art could be employed in lieu of or in addition to the use of the test probes, of course. If the bonding was successful, the apparatus positions the printhead body 18 and printed circuit board 28 with the next joint to be bonded under the work area at its proper position. If not, a repeat bonding is affected by the wire-bonding apparatus 64. If the bond once again proves to have a lack of electrical continuity therethrough, it is preferred that the bonding apparatus be halted and that a human operator be called to visually inspect and manually correct the problem before automated assembly continues. In this manner, maximum throughput can be affected.

Wherefore, having thus described our invention, we claim:

1. The method of forming and attaching an electrostatic printhead to a printed circuit board to make an electrostatic printhead assembly comprising the steps of:

(a) disposing a plurality of wires within an insulating material in a common plane in parallel, spaced relationship;

(b) cutting the wires and the insulating material adjacent one end of the wires in a plane perpendicular to the wires to form a print head face;

(c) cutting the wires and the insulating material adjacent the other end of the wires to form an attachment face having the ends of the wires exposed at the surface thereof;

(d) disposing a plurality of spaced, metal, electrical contacts along the edge of the printed circuit board;

(e) positioning the printed circuit board with the electrical contacts in adjacent, parallel, spaced relationship with the ends of the wires of the attachment face; and, (f) wire bonding connecting wires between the electrical contacts and the exposed ends of the wires of the attachment face.

2. The method of claim 1 wherein said step (c) of cutting the wires and the insulating material to form an attachment face comprises the steps of:

(c1) cutting the wires and the insulating material adjacent the other end of the wires in a plane perpendicular to the wires; and, (c2) removing a portion of the wires and the insulating material from one side of the wires to a point in a plane passing midway through the wires to form a ledge in the insulating material having the exposed ends of the wires to which the wire bonding is made in the form of elongated rectangular pads.

3. The method of claim 1 wherein said step (c) of cutting the wires and the insulating material to form an attachment face comprises the step of:

cutting the wires and the insulating material adjacent the other end of the wires in a plane forming an acute angle with the wires whereby the exposed ends of the wires to which the wire bonding is made are in the form of elongated elliptical pads.

4. The method of claim 1 wherein step (e) of positioning the printed circuit board comprises the steps of:

(e1) cutting a notch in the insulating material of the attachment face adjacent and parallel to the exposed wire ends; and, (e2) attaching the insulating material to the edge of the printed circuit board with the printed circuit board in the notch.

5. The method of assembling an electrostatic printhead assembly comprising the steps of:

(a) disposing a plurality of first wires within an insulating material in a first common plane in parallel, spaced relationship;

(b) disposing a plurality of second wires within the insulating material in parallel, spaced relationship in a second common plane parallel to the first common plane;

(c) cutting the wires and the insulating material adjacent one end of the wires in a plane perpendicular to the wires to form a print head face;

(d) cutting the wires and the insulating material adjacent the other end of the wires to form an attachment face having the ends of the wires exposed at the surface thereof;

(e) disposing a plurality of spaced, metal, electrical contacts along the edge of a first printed circuit board;

(f) disposing a plurality of spaced, metal, electrical contacts along the edge of a second printed circuit board;

(g) positioning the printed circuit boards and the attachment face in a common plane with respective ones of the board on each side of the insulating material with the electrical contacts in adjacent, parallel, spaced relationship with the ends of the wires of the attachment face;

(h) wire bonding connecting wires between the electrical contacts and the exposed ends of the wires of the attachment face;

(i) bending the connecting wires 90° to fold the printed circuit boards towards one another to a position of parallel, spaced relationship with one another; and, (j) disposing insulation between the printed circuit boards.

6. Apparatus for forming and attaching an electrostatic printhead to a printed circuit board to make an electrostatic printhead assembly comprising:

(a) means for disposing a plurality of wires within an insulating material in a common plane in parallel, spaced relationship;

(b) means for cutting the wires and the insulating material adjacent one end of the wires in a plane perpendicular to the wires to form a print head face;

(c) means for cutting the wires and the insulating material adjacent the other end of the wires to form an attachment face having the ends of the wires exposed at the surface thereof;

(d) means for disposing a plurality of spaced, metal, electrical contacts along the edge of the printed circuit board;

(e) means for positioning the printed circuit board with the electrical contacts in adjacent, parallel, spaced relationship with the ends of the wires of the attachment face; and, (f) means for wire bonding connecting wires between the electrical contacts and the exposed ends of the wires of the attachment face.

7. The apparatus of claim 6 wherein said means for cutting the wires and the insulating material to form an attachment face comprises:

(a) means for cutting the wires and the insulating material adjacent the other end of the wires in a plane perpendicular to the wires; and, (b) means for removing a portion of the wires and the insulating material from one side of the wires to a point in a plane passing midway through the wires to form a ledge in the insulating material having the exposed ends of the wires to which the wire bonding is made in the form of elongated rectangular pads.

8. The apparatus of claim 6 and additionally comprising:

(a) means for cutting a notch in the insulating material of the attachment face adjacent and parallel to the exposed wire ends; and, (b) means for attaching the insulating material to the edge of the printed circuit board.

9. The apparatus of claim 6 and additionally comprising:

(a) means for testing the electrical continuity of each wire bond; and, (b) means for re-bonding any wire bond which does not test as satisfactory.

10. Apparatus for forming and attaching an electrostatic printhead to a printed circuit board to make an electrostatic printhead assembly comprising:

(a) means for disposing a plurality of first wires within an insulating material in a first common plane in parallel, spaced relationship and for disposing a plurality of second wires within said insulating material in parallel, spaced relationship in a second common plane parallel to said first common plane;

(b) means for cutting the wires and said insulating material adjacent one end of said first and second wires in a plane perpendicular to said wires to form a print head face;

(c) means for removing a portion of said first wires and said insulating material from one side of said first wires to a point in a plane passing midway through said first wires to form a first ledge in said insulating material whereby the exposed ends of said first wires form of a plurality of elongated rectangular first pads;

(d) means for cutting through said first wires and for removing a portion of said second wires and said insulating material from said one side of said first wires to a point in a plane passing midway through said second wires to form a second ledge in said insulating material adjacent said first ledge whereby the exposed ends of said second wires form of a plurality of elongated rectangular second pads adjacent to said first pads;

(e) means for disposing a plurality of spaced, metal, electrical contacts along the edge of the printed circuit board;

(f) means for positioning the printed circuit board with said first and second pads in adjacent, parallel, spaced relationship with said electrical contacts;

(g) means for wire bonding first connecting wires between said electrical contacts and said second pads; and, (h) means for wire bonding second connecting wires between said electrical contacts and said first pads.

11. The apparatus of claim 10 and additionally comprising:

(a) means for covering said first connecting wires with insulation; and, (b) means for covering said second connecting wires with insulation.

12. The apparatus of claim 10 and additionally comprising:

(a) means for cutting a notch in said insulating material adjacent and parallel to said second ledge; and, (b) means for attaching said insulating material to an edge of the printed circuit board.

13. The apparatus of claim 10 and additionally comprising:

(a) means for testing the electrical continuity of each wire bond; and, (b) means for re-bonding any wire bond which does not test as satisfactory.

14. In an electrostatic printhead member comprising a plurality of wires within an insulating material in a common plane in parallel, spaced relationship wherein the wires and the insulating material adjacent one end of the wires are cut in a plane perpendicular to the wires to form a print head face and the wires extend from the insulating material on the other end, the method of attaching the member to a printed circuit board comprising the steps of:

(a) cutting the wires and the insulating material of the member adjacent the other end of the wires to form an attachment face having the ends of the wires exposed at the surface thereof;

(b) disposing a plurality of spaced, metal, electrical contacts along the edge of the printed circuit board;

(c) positioning the printed circuit board with the electrical contacts in adjacent, parallel, spaced relationship with the ends of the wires of the attachment face; and, (d) wire bonding connecting wires between the electrical contacts and the exposed ends of the wires of the attachment face.

15. The method of claim 14 wherein said step (a) of cutting the wires and the insulating material of the member to form an attachment face comprises the steps of:

(a1) cutting the wires and the insulating material of the member adjacent the other end of the wires in a plane perpendicular to the wires; and, (a2) removing a portion of the wires and the insulating material of the member from one side of the wires to a point in a plane passing midway through the wires to form a ledge in the member having the exposed ends of the wires to which the wire bonding is made in the form of elongated rectangular pads.

16. The method of claim 14 wherein said step (a) of cutting the wires and the insulating material of the member to form an attachment face comprises the step of:

cutting the wires and the insulating material of the member adjacent the other end of the wires in a plane forming an acute angle with the wires whereby the exposed ends of the wires to which the wire bonding is made are in the form of elongated elliptical pads.

17. The method of claim 14 wherein step (c) of positioning the printed circuit board comprises the steps of:

(c1) cutting a notch in the attachment face of the member adjacent and parallel to the exposed wire ends; and, (c2) attaching the member to an edge of the printed circuit board with the member disposed in the notch.

18. In an electrostatic printhead member comprising a plurality of wires within an insulating material in a common plane in parallel, spaced relationship wherein the wires and the insulating material adjacent one end of the wires are cut in a plane perpendicular to the wires to form a print head face and the wires extend from the insulating material on the other end, the method of attaching the member to a printed circuit board comprising the steps of:

(a) cutting the wires and the insulating material of the member adjacent the other end of the wires in a plane perpendicular to the wires to form an attachment face having the ends of the wires exposed at the surface thereof;

(b) disposing a plurality of spaced, metal, electrical contacts along the edge of a first printed circuit board;

(c) disposing a plurality of spaced, metal, electrical contacts along the edge of a second printed circuit board;

(d) positioning the printed circuit boards and the attachment face in a common plane with respective ones of the boards on each side of the insulating material with the electrical contacts in adjacent, parallel, spaced relationship with the ends of the wires of the attachment face;

(e) wire bonding connecting wires between the electrical contacts and the exposed ends of the wires of the attachment face;

(f) bending the connecting wires 90° to fold the printed circuit boards towards one another to a position of parallel, spaced relationship with one another; and, (g) disposing insulation between the printed circuit boards.

19. Automated apparatus for connecting an electrostatic printhead member comprising a plurality of wires in a common plane in parallel, spaced relationship within an insulating material and exposed on an attachment face to the electrical contacts of a printed circuit board attached to the member along an edge and perpendicular to the wires comprising:

(a) gripping means for holding the printed circuit boards;

(b) powered moving means for moving said gripping means and a printed circuit board held therein to desired positions and for maintaining them in said positions;

(c) bonding means for wire bonding the end of a connecting wire to a piece of metal positioned at a bonding location;

(d) positioning means for positioning bonding wires at a desired location, said positioning means including means for supplying bonding wires at said desired location; and, (e) logic and control means connected to said moving means, said bonding means, and said positioning means for causing said moving means to sequentially move the exposed ends of each of the wires to a work station and, for each wire at said work station, causing said positioning means to position one end of a bonding wire on the exposed end of the wire at the work station, causing said bonding means to bond said one end to said exposed end, causing said positioning means to position the other end of said bonding wire on the electrical contact associated with the exposed end of the wire at the work station, and causing said bonding means to bond said other end to said electrical contact.

20. The automated apparatus of claim 19 and additionally comprising:

video camera means included within said logic and control means for viewing said workstation and using data therefrom for aligning said bonding wire ends with said exposed wire ends and said electrical contacts.

21. The automated apparatus of claim 19 and additionally comprising:

testing means included within said logic and control means for testing the electrical continuity from each said exposed end through said bonding wire to said electrical contact before the next said exposed end is moved to said work station and for re-bonding any connections which are not satisfactory.

22. In automated apparatus for connecting an electrostatic printhead member comprising a plurality of wires in a common plane in parallel, spaced relationship within an insulating material and exposed on an attachment face to the electrical contacts of a printed circuit board attached to the member along an edge and perpendicular to the wires the method of operation comprising the steps of:

(a) providing gripping means for holding the printed circuit board;

(b) providing powered moving means for moving the gripping means and a printed circuit board held therein to desired positions and for maintaining them in those positions;

(c) providing bonding means for wire bonding the end of a connecting wire to a piece of metal positioned at a bonding location;

(d) providing positioning means for positioning bonding wires at a desired location and including means for supplying bonding wires at the desired location; and, (e) causing the moving means to sequentially move the exposed ends of each of the wires to a work station and, for each wire at the work station, causing the positioning means to position one end of a bonding wire on the exposed end of the wire at the work station, causing the bonding means to bond the one end to the exposed end, causing the positioning means to position the other end of the bonding wire on the electrical contact associated with the exposed end of the wire at the work station, and causing the bonding means to bond the other end to the electrical contact.

23. The method of claim 19 and additionally comprising the steps of:

testing the electrical continuity from each exposed end through the bonding wire to the electrical contact before the next the exposed end is moved to the work station and re-bonding any connections which are not satisfactory.

24. In a member comprising a plurality of wires within an insulating material in spaced relationship to one another wherein the wires extend from the insulating material on one end, the method of attaching the member to a printed circuit board comprising the steps of:

(a) cutting the wires and the insulating material of the member adjacent the one end of the wires to form an attachment face having the ends of the wires exposed at the surface thereof;

(b) disposing a plurality of spaced, metal, electrical contacts adjacent an edge of the printed circuit board;

(c) positioning the printed circuit board with the electrical contacts in adjacent, spaced relationship with the ends of the wires of the attachment face; and, (d) wire bonding connecting wires between the electrical contacts and the exposed ends of the wires of the attachment face.

25. The method of claim 14 wherein said step (a) of cutting the wires and the insulating material of the member to form an attachment face comprises the steps of:

(a1) cutting the wires and the insulating material of the member adjacent the one end of the wires in a plane perpendicular to the wires; and, (a2) removing a portion of the wires and the insulating material of the member from one side of the wires to a point in a plane passing midway through the wires to form a ledge in the member having the exposed ends of the wires to which the wire bonding is made in the form of elongated rectangular pads.

26. The method of claim 24 wherein said step (a) of cutting the wires and the insulating material of the member to form an attachment face comprises the step of:

cutting the wires and the insulating material of the member adjacent the one end of the wires in a plane forming an acute angle with the wires whereby the exposed ends of the wires to which the wire bonding is made are in the form of elongated elliptical pads.

* * * * *